(12) United States Patent
Chiba et al.

(10) Patent No.: US 11,142,049 B2
(45) Date of Patent: Oct. 12, 2021

(54) RESIN BACK DOOR FOR VEHICLE

(71) Applicants: TOYOTA JIDOSHA KABUSHIKI KAISHA, Toyota (JP); TOYOTA JIDOSHA KYUSHU KABUSHIKI KAISHA, Miyawaka (JP)

(72) Inventors: Kenji Chiba, Tokai (JP); Takayuki Okubo, Toyota (JP); Kiyokazu Nitta, Miyoshi (JP); Futoshi Saito, Fukutsu (JP)

(73) Assignees: TOYOTA JIDOSHA KABUSHIKI KAISHA, Toyota (JP); TOYOTA JIDOSHA KYUSHU KABUSHIKI KAISHA, Miyawaka (JP)

( * ) Notice: Subject to any disclaimer, the term of this patent is extended or adjusted under 35 U.S.C. 154(b) by 236 days.

(21) Appl. No.: 16/230,392

(22) Filed: Dec. 21, 2018

(65) Prior Publication Data

US 2019/0193533 A1 Jun. 27, 2019

(30) Foreign Application Priority Data

Dec. 21, 2017 (JP) .............................. JP2017-244679

(51) Int. Cl.
*B60J 5/10* (2006.01)
*B60J 5/04* (2006.01)
*B62D 29/04* (2006.01)
*B62D 35/00* (2006.01)

(52) U.S. Cl.
CPC ............. *B60J 5/107* (2013.01); *B60J 5/0433* (2013.01); *B60J 5/10* (2013.01); *B60J 5/101* (2013.01); *B62D 29/043* (2013.01); *B62D 35/007* (2013.01)

(58) Field of Classification Search
CPC . B60J 5/107; B60J 5/0433; B60J 5/10; B62D 29/043; B62D 35/007
See application file for complete search history.

(56) References Cited

U.S. PATENT DOCUMENTS

| 8,550,536 | B2* | 10/2013 | Gachter | B60J 5/101 296/146.8 |
| 8,991,898 | B2* | 3/2015 | Iwano | B60J 5/0429 296/146.6 |
| 2007/0145773 | A1* | 6/2007 | Saitoh | B60J 5/101 296/146.8 |
| 2008/0030047 | A1* | 2/2008 | Munenaga | B60J 5/101 296/146.6 |
| 2010/0102589 | A1* | 4/2010 | Miyake | B60S 1/583 296/146.8 |
| 2011/0074179 | A1* | 3/2011 | Kuntze | B60J 5/107 296/146.6 |

(Continued)

FOREIGN PATENT DOCUMENTS

| JP | 2015-058808 A | 3/2015 |
| JP | 5846036 B2 | 1/2016 |
| JP | 2017-132347 A | 8/2017 |

*Primary Examiner* — Marcus Menezes
(74) *Attorney, Agent, or Firm* — Oliff PLC

(57) ABSTRACT

Provided is a resin back door for a hatchback vehicle including a resin inner panel, a resin outer panel, and a lower-side reinforcing member made of metal extending in a vehicle width direction to be fixed to a lower side portion of the inner panel. The lower-side reinforcing member is locked to a vehicle lower structure via a door lock mechanism when the resin back door is closed.

7 Claims, 10 Drawing Sheets

(56) References Cited

U.S. PATENT DOCUMENTS

2011/0179719 A1* 7/2011 Matsumoto ................ B60J 5/10
49/502
2020/0009949 A1* 1/2020 Tichy .................. B29C 65/1412

* cited by examiner

RESIN BACK DOOR FOR VEHICLE

CROSS REFERENCE TO RELATED APPLICATION

This application claims priority to Japanese Patent Application No. 2017-244679 filed on Dec. 21, 2017, which is incorporated herein by reference in its entirety including the specification, claims, drawings, and abstract.

TECHNICAL FIELD

The present disclosure relates to a structure of a resin back door for a vehicle including a resin inner panel, a resin outer panel, and a lower-side reinforcing member made of metal.

BACKGROUND

In recent years, many vehicle doors made of resin have been used. The doors made of resin have a reduced weight but ensuring rigidity is difficult as compared with doors made from steel plate. Therefore, in order to ensure rigidity, a structure has been proposed in which an L-shaped metal reinforcing member is attached to an upper portion and right and left side portions of an inner panel or a horizontal reinforcing member extending in a vehicle width direction to be connected to right and left L-shaped metal reinforcing members is attached below a back window (e.g., see JP 5846036 B).

SUMMARY

Incidentally, a resin hatchback door is turnably mounted to a vehicle upper structure via a pair of right and left hinges at upper portions and includes a door lock mechanism for connection to a vehicle lower structure at a lower center. Therefore, when the resin back door is closed, the resin back door is supported on a vehicle body at three points of the pair of right and left hinges at the upper portions and the lock mechanism at the lower center.

When a resin back door is inclined to the rear side of a vehicle and a lock mechanism at a lower center is located on the rear side of the vehicle relative to a pair of right and left hinges, as in a hatchback vehicle, thermal deformation of the resin back door may be caused by temperature rise due to sunlight. Such thermal deformation may thermally deform both ends of a lower portion of the resin back door, farthest from support points on a vehicle body, to the rear side of the vehicle. Since a metal vehicle body to which the resin back door is attached has no large thermal deformation unlike a resin back door, temperature rise due to sunlight sometimes causes a level difference between the vehicle body and an outer periphery of the resin back door, resulting in poor appearance.

Therefore, an object of the present disclosure is to suppress a deterioration in appearance of a resin back door due to temperature rise.

Solution to Problem

A resin back door for a vehicle according to the present disclosure is a resin back door for a hatchback vehicle including a resin inner panel, a resin outer panel, and a lower-side reinforcing member made of metal extending in a vehicle width direction to be fixed to a lower side portion of the inner panel. The lower-side reinforcing member has a center portion in a vehicle width direction locked to a vehicle lower structure via a door lock mechanism upon closing the resin back door.

The lower-side reinforcing member is fixed to the lower side portion of the inner panel and the center portion in the vehicle width direction is locked to the vehicle lower structure having less thermal deformation via the lock mechanism. When temperature rises due to sunlight, both side portions of the lower-side reinforcing member suppress deformation of respective sides of a lower portion of the resin back door to a rear side of the vehicle relative to a center portion of the vehicle. This suppresses occurrence of a level difference between an outer periphery of the resin back door and a vehicle body, suppressing a deterioration in appearance of the resin back door.

The lower-side reinforcing member may include a strip-shaped body including the center portion in a vehicle width direction and side portions in a vehicle width direction, a first extending portion extending to a rear side of the vehicle from the center portion in a vehicle width direction to an end portion for the outer panel in the lower side portion of the inner panel, and second extending portions extending to the rear side of the vehicle from the side portions in a vehicle width direction so that a length of a second extending portion in a vehicle longitudinal direction may be smaller than a length of the first extending portion in a vehicle longitudinal direction.

The second extending portions provided on both side portions of the lower-side reinforcing member are shorter than the first extending portion. The second extending portions extend to the rear side of the vehicle but do not reach the end portion for the outer panel in the lower side portion of the inner panel. Therefore, when temperature rises due to sunlight, a lower end of the inner panel and a lower end of the outer panel positioned on the rear side of the vehicle relative to the second extending portion are displaced to turn to the front side of the vehicle. This turning displacement to the front side of the vehicle cancels displacement of the lower end of the inner panel and the lower end of the outer panel to the rear side of the vehicle. Therefore, a level difference between the outer periphery of the resin back door and the vehicle body can be suppressed more effectively, and a deterioration in appearance of the resin back door can be effectively suppressed.

The resin back door for a vehicle according to the present disclosure may be configured so that an upper side portion of the inner panel has both side portions in a vehicle width direction turnably attached to a vehicle upper structure via hinges, and the resin back door for a vehicle includes a left reinforcing member, a right reinforcing member, a left corner connecting member, and a right corner connecting member. The left reinforcing member is made of substantially L-shaped metal to be fixed along the upper side portion and a left side portion of the inner panel, and includes an upper left shoulder portion opposed to the upper side portion and configured so that one end of any of the hinges is secured, and a left arm portion opposed to the left side portion. The right reinforcing member is made of substantially L-shaped metal to be fixed along the upper side portion and a right side portion of the inner panel, and includes an upper right shoulder portion opposed to the upper side portion and configured so that one end of the other hinge is secured, and a right arm portion opposed to the right side portion. The left corner connecting member is made of metal to connect the lower side reinforcing member and a lower end of the left arm portion of the left reinforcing member. The right corner connecting member is made of metal to connect the lower side reinforcing member and a lower end of the right arm portion of the right reinforcing member.

In this manner, the left reinforcing member and the right reinforcing member to which the hinges are fastened at one end, and the lower-side reinforcing member locked to the vehicle lower structure via the door lock mechanism are connected by the left corner connecting member and the right corner connecting member. Thus, the rigidity of the left reinforcing member and the right reinforcing member also more effectively suppresses deformation of both sides of the lower portion of the resin back door to the rear side of the vehicle. Thus, occurrence of a level difference between the outer periphery of the resin back door and the vehicle body is effectively suppressed, and more effectively suppresses a deterioration in appearance of the resin back door.

Advantageous Effects of Invention

According to the present disclosure, a deterioration in appearance of a resin back door due to temperature rise can be suppressed.

BRIEF DESCRIPTION OF DRAWINGS

Embodiment(s) of the present disclosure will be described by reference to the following figures, wherein.

DESCRIPTION OF EMBODIMENTS

Figure 1:
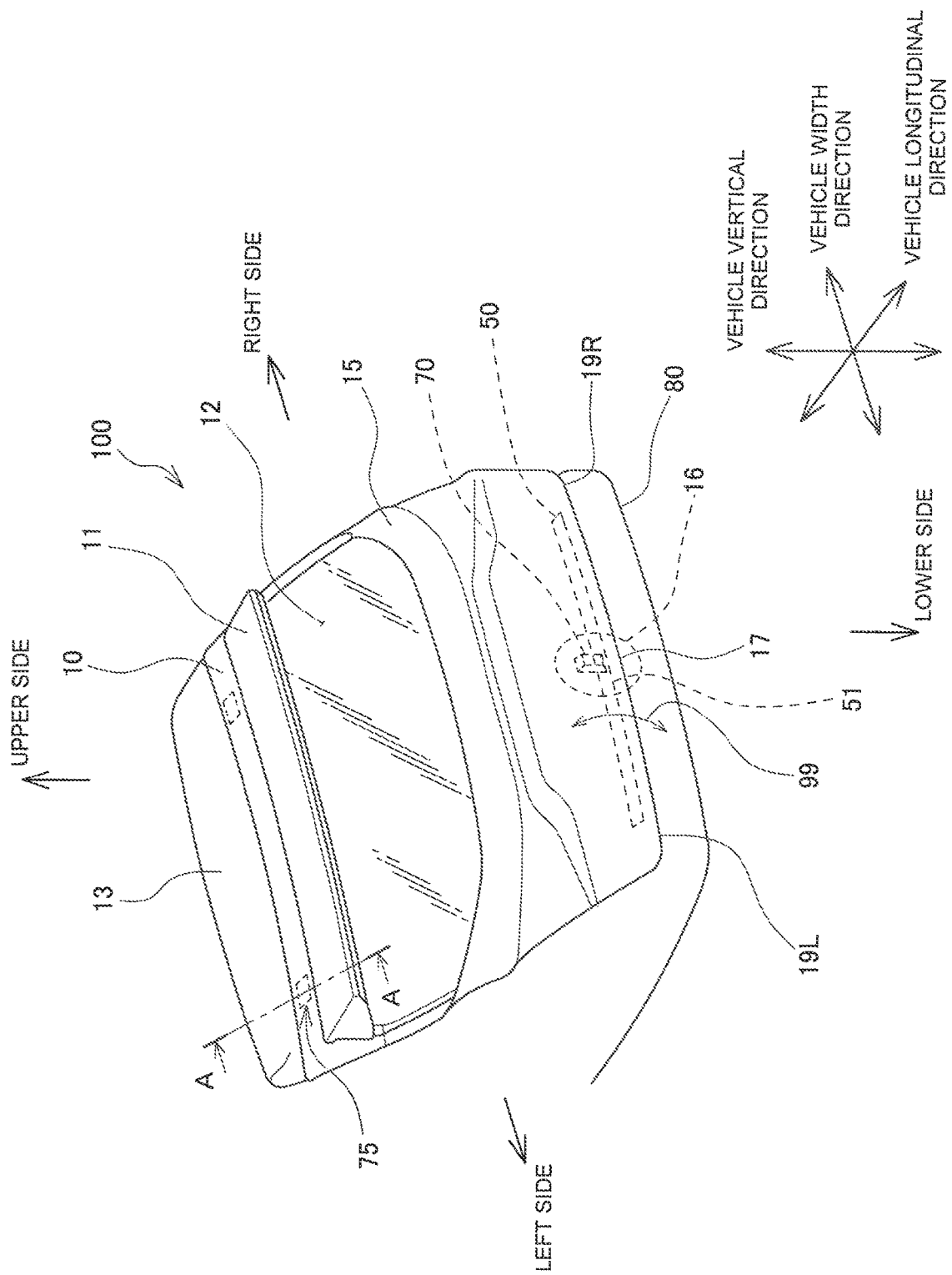
FIG. 1 is a perspective view of a resin back door according to an embodiment.
Figure 2:
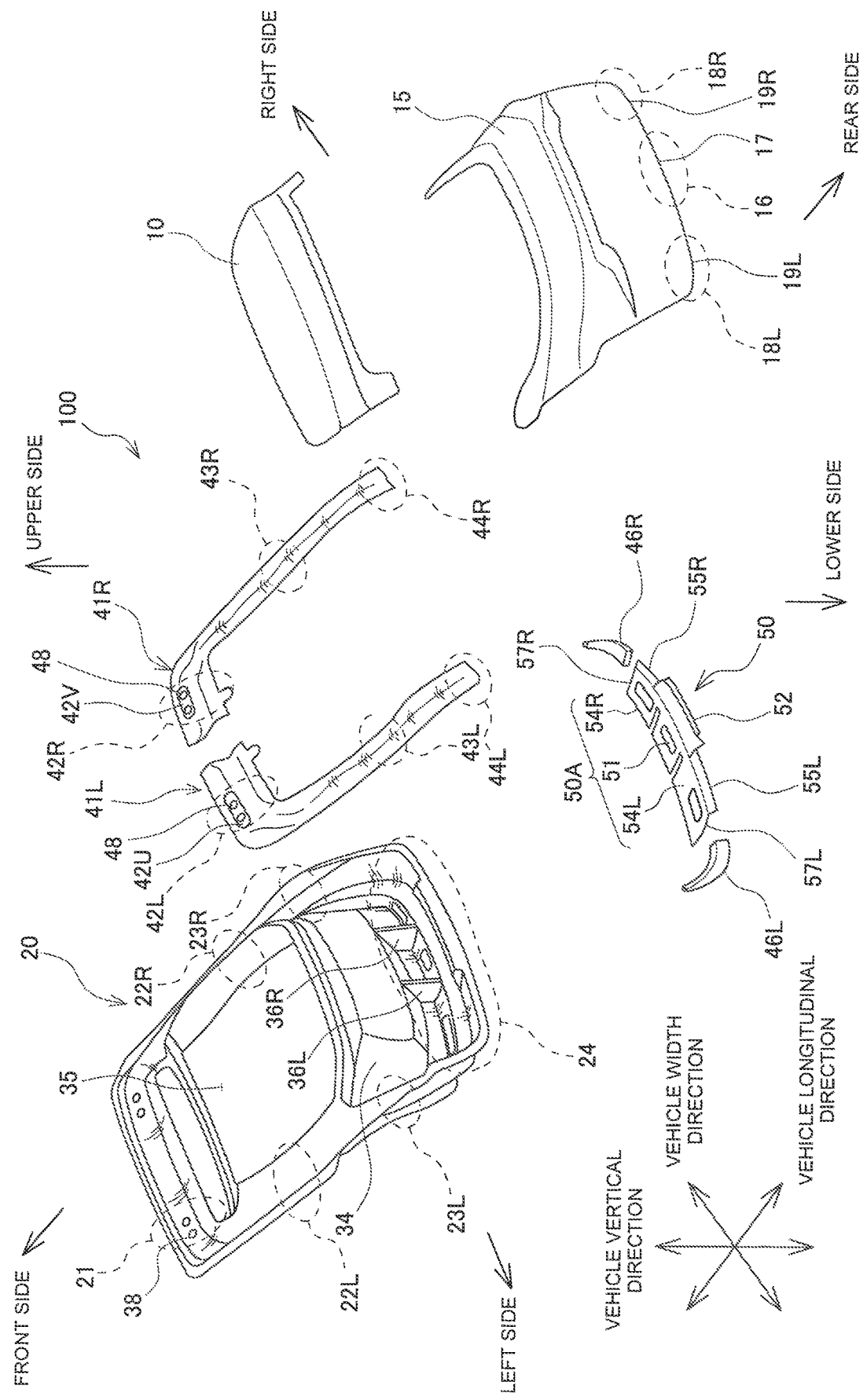
FIG. 2 is an exploded perspective view of a resin back door according to an embodiment.

Hereinafter, a resin back door 100 for a vehicle according to an embodiment will be described with reference to the drawings. The resin back door 100 for a vehicle includes a resin upper outer panel 10 and a lower outer panel 15 as illustrated in FIG. 1, a resin inner panel 20 as illustrated in FIG. 2, and a left reinforcing member 41L, a right reinforcing member 41R, a lower-side reinforcing member 50, a left corner connecting member 46L, and a right corner connecting member 46R which are made of metal and fixed to the inner panel 20. The right side and the left side are described as the right side and the left side as viewed from a rear side of the vehicle.

In the resin back door 100, both side portions of an upper side portion 21 of the inner panel 20 in the vehicle width direction are turnably attached to a roof panel 13 being a vehicle upper structure via hinges 75, as illustrated in FIG. 1, and the resin back door 100 is a hatch door opened and closed by turning a lower center portion 16 of the lower outer panel 15 to the upper side of the vehicle, as indicated by an arrow 99 of FIG. 1. When the resin back door 100 is closed, a center plate portion 51 of the lower-side reinforcing member 50 at the center in a vehicle width direction is locked to a vehicle lower structure 80 via a door lock mechanism 70.

As illustrated in FIG. 2, an opening 35 for a back window 12 is provided at the center of the inner panel 20, and the inner panel 20 includes the upper side portion 21 positioned above the opening 35 and configured so that the upper outer panel 10 is assembled thereto, a left side portion 22L and a right side portion 22R positioned on outer sides of the opening 35 in a vehicle width direction, and a lower left portion 23L and a lower right portion 23R positioned on the outer sides in a vehicle width direction below the opening 35 and configured so that the lower outer panel 15 is assembled thereto, and a lower side portion 24. Furthermore, on either side of the upper side portion 21 of the inner panel 20, two holes 38 are provided to pass bolts 79a for attaching a hinge 75 illustrated in FIG. 3.

As illustrated in FIG. 2, the left reinforcing member 41L has a substantially L shape extending along the upper side portion 21, the left side portion 22L, and the lower left portion 23L of the inner panel 20, and the right reinforcing member 41R has a substantially L shape extending along the upper side portion 21, the right side portion 22R, and the lower right portion 23R of the inner panel 20. The left reinforcing member 41L includes an upper left shoulder portion 42L assembled to be opposed to the upper side portion 21 of the inner panel 20, a left arm portion 43L assembled to be opposed to the left side portion 22L and the lower left portion 23L of the inner panel 20. The right reinforcing member 41R is symmetrical to the left reinforcing member 41L, and includes an upper right shoulder portion 42R and a right arm portion 43R. The left corner connecting member 46L is a member having a substantially L-shape to connect a lower end portion 44L of the left reinforcing member 41L and a left end 57L of the lower-side reinforcing member 50. The right corner connecting member 46R is a member having a substantially L shape to connect a lower end portion 44R of the right reinforcing member 41R and a right end 57R of the lower-side reinforcing member 50.

Figure 3:
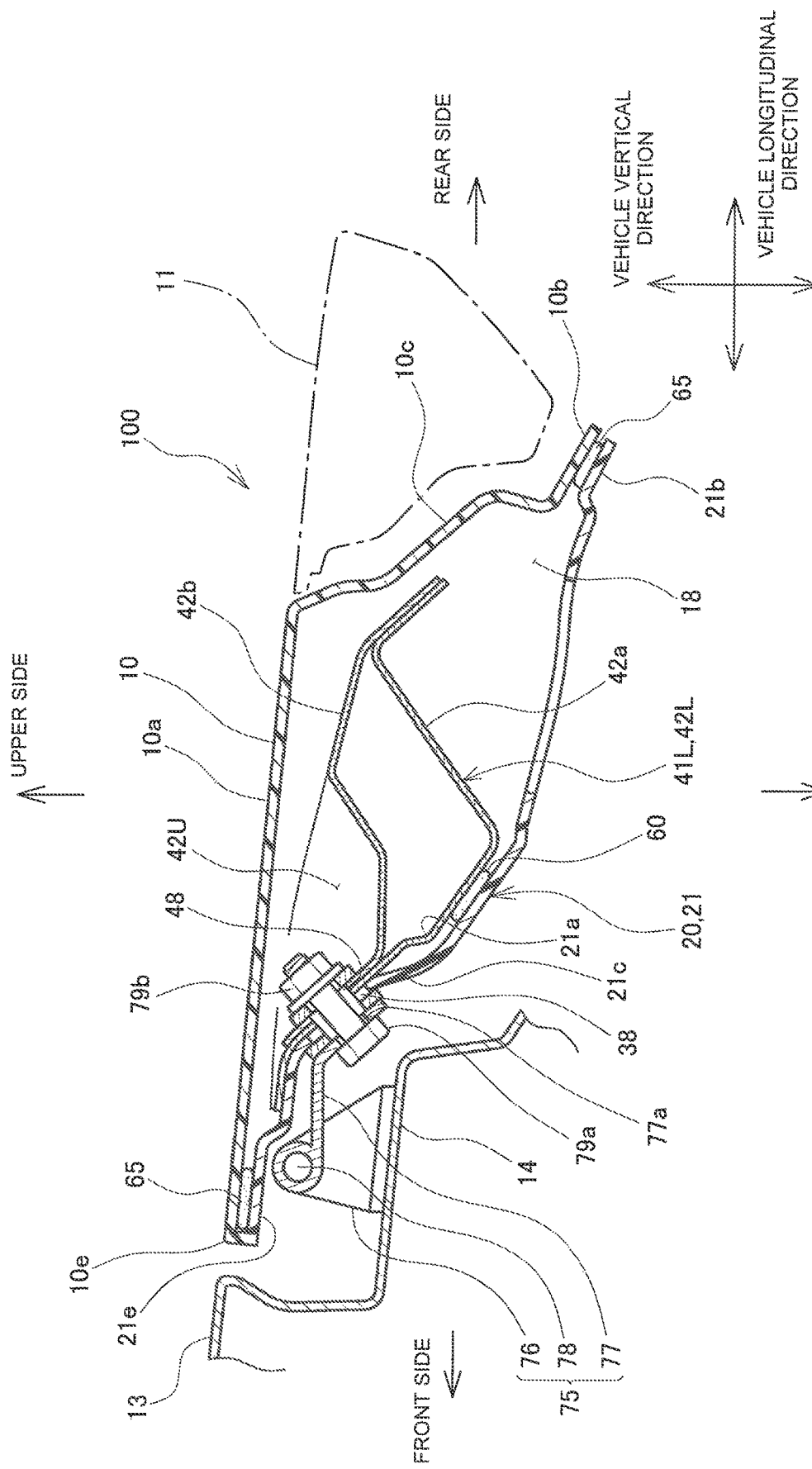
FIG. 3 is a cross-sectional view taken along line A-A of FIG. 1.

As illustrated in FIG. 3, the upper left shoulder portion 42L of the left reinforcing member 41L and the upper outer panel 10 are assembled on the left side of the upper side portion 21 of the inner panel 20. The upper side portion 21 of the inner panel 20 includes a groove portion 21a having a substantially V-shape recessed downward in the vehicle vertical direction, a flange 21c extending after bending in a vehicle longitudinal direction from the groove portion 21a, a parting portion 21e positioned on a front side of the vehicle, and an end portion 21b positioned on a rear side of the vehicle.

The upper outer panel 10 is protruded upward in a substantially V-shape in a vehicle vertical direction, and includes a front portion 10a constituting a design surface, and a rear portion 10c to which a resin spoiler 11 is assembled. The front portion 10a has a front end 10e assembled to the parting portion 21e of the inner panel 20 with an adhesive 65 and the rear portion 10c has a rear end 10b assembled to the end portion 21b of the inner panel 20 with the adhesive 65. In this way, when the upper outer panel 10 having a substantially V-shape protruded upward is assembled to the inner panel 20 having a substantially V-shape recessed downward, a hollow space 18 is formed thereinside, and the upper left shoulder portion 42L of the left reinforcing member 41L is assembled in the hollow space 18.

The upper left shoulder portion 42L of the left reinforcing member 41L includes an inner plate 42a positioned near the inner panel 20 and substantially cranked, and an outer plate 42b positioned near the upper outer panel 10 and substantially cranked. The upper left shoulder portion 42L is formed by displacing the inner plate 42a and the outer plate 42b in the vehicle longitudinal direction so as to define a trapezoidal closed cross-section at the center, and performing friction stir welding (FSW) or spot-welding on both end portions of the inner plate 42a and the outer plate 42b. The center portion of the inner plate 42a is fixed in the groove portion 21a of the inner panel 20 with an adhesive 60.

The outer plate 42b has an upper side where a recessed portion 42U is defined, as illustrated in FIGS. 2 and 3, and the inner plate 42a and the outer plate 42b of the recessed portion 42U are provided with holes 48 for passing bolts 79a for attaching a hinge As illustrated in FIG. 3, a hinge 75 includes a base 76 fixed to a step portion 14 of the roof panel 13 being the vehicle upper structure, a shaft 78 mounted to the base 76, and a turning plate 77 turnably attached around the shaft 78. The turning plate 77 constitutes one end of the hinge 75. The bolts 79a are passed through holes 77a in the turning plate 77, the holes 38 in the inner panel 20, and the holes 48 provided in the upper left shoulder portion 42L of the left reinforcing member 41L, and then threaded into nuts 79b welded and fixed to the outer plate 42b. Thus, the left side of the upper side portion 21 of the inner panel 20 and the left reinforcing member 41L are fastened to the turning plate 77 of the left hinge 75.

The right reinforcing member 41R is symmetrical to the left reinforcing member 41L, and the upper right shoulder portion 42R is provided with a recessed portion 42V, and the inner plate 42a and the outer plate 42b of the recessed portion 42V are provided with holes 48 for passing bolts 79a for attaching a hinge. The bolts 79a are passed through the holes 38 in the inner panel 20 and the holes 48 provided in the upper right shoulder portion 42R of the right reinforcing member 41R, and then threaded into nuts 79b welded and fixed to the outer plate 42b. Thus, the right side of the upper side portion 21 of the inner panel 20 and the right reinforcing member 41R are fastened to the turning plate 77 of the right hinge 75.

In this manner, the resin back door 100 is turnably attached to the roof panel 13 via the hinges 75 fastened to the right and left sides of the upper side portion 21 of the inner panel 20. As indicated by the arrow 99 in FIG. 1, the resin back door 100 is opened and closed by turning the lower center portion 16 of the lower outer panel 15 to the upper side of the vehicle.

Figure 4:
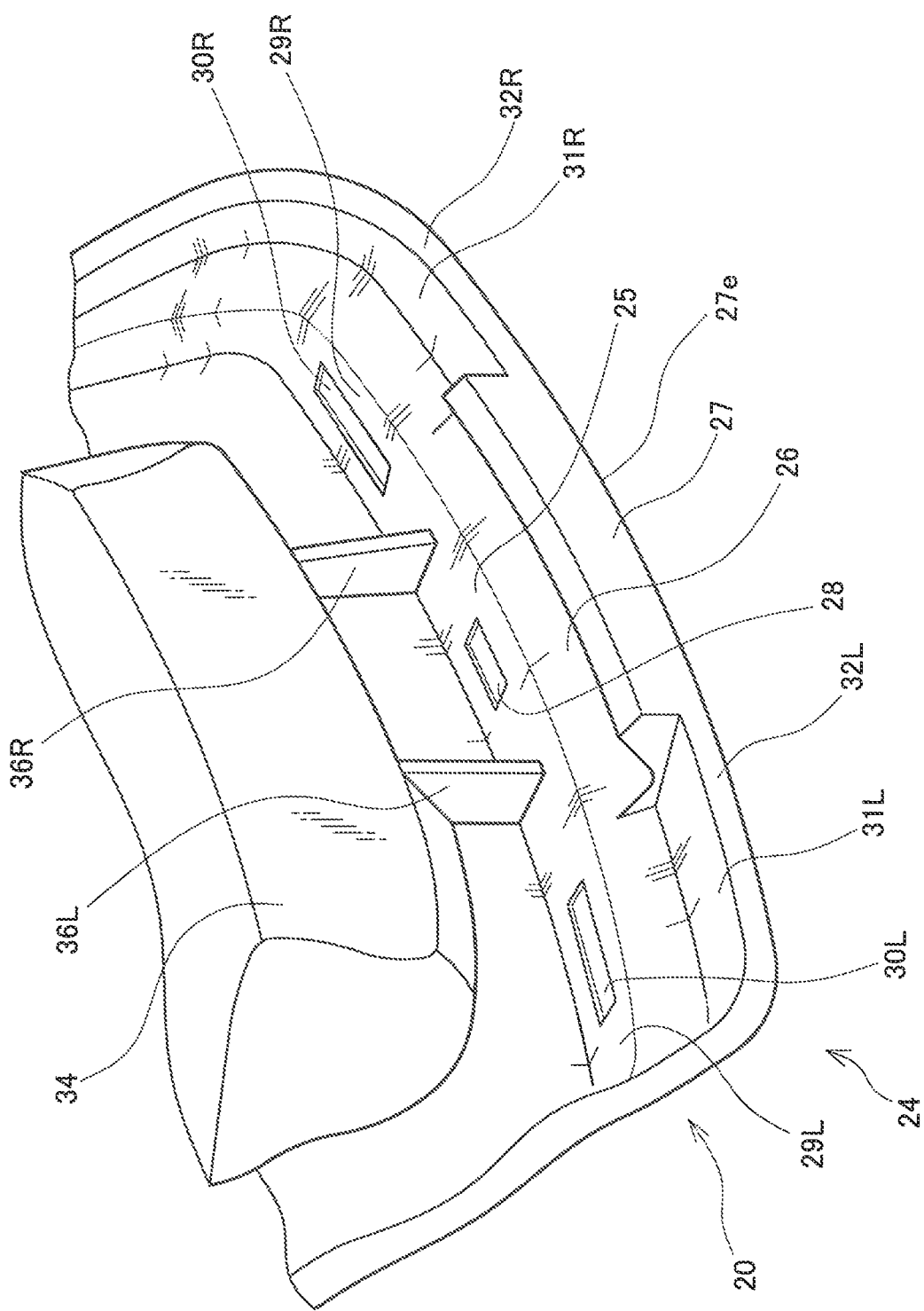
FIG. 4 is a perspective view of a lower side portion of an inner panel of a back door according to an embodiment.
Figure 7:
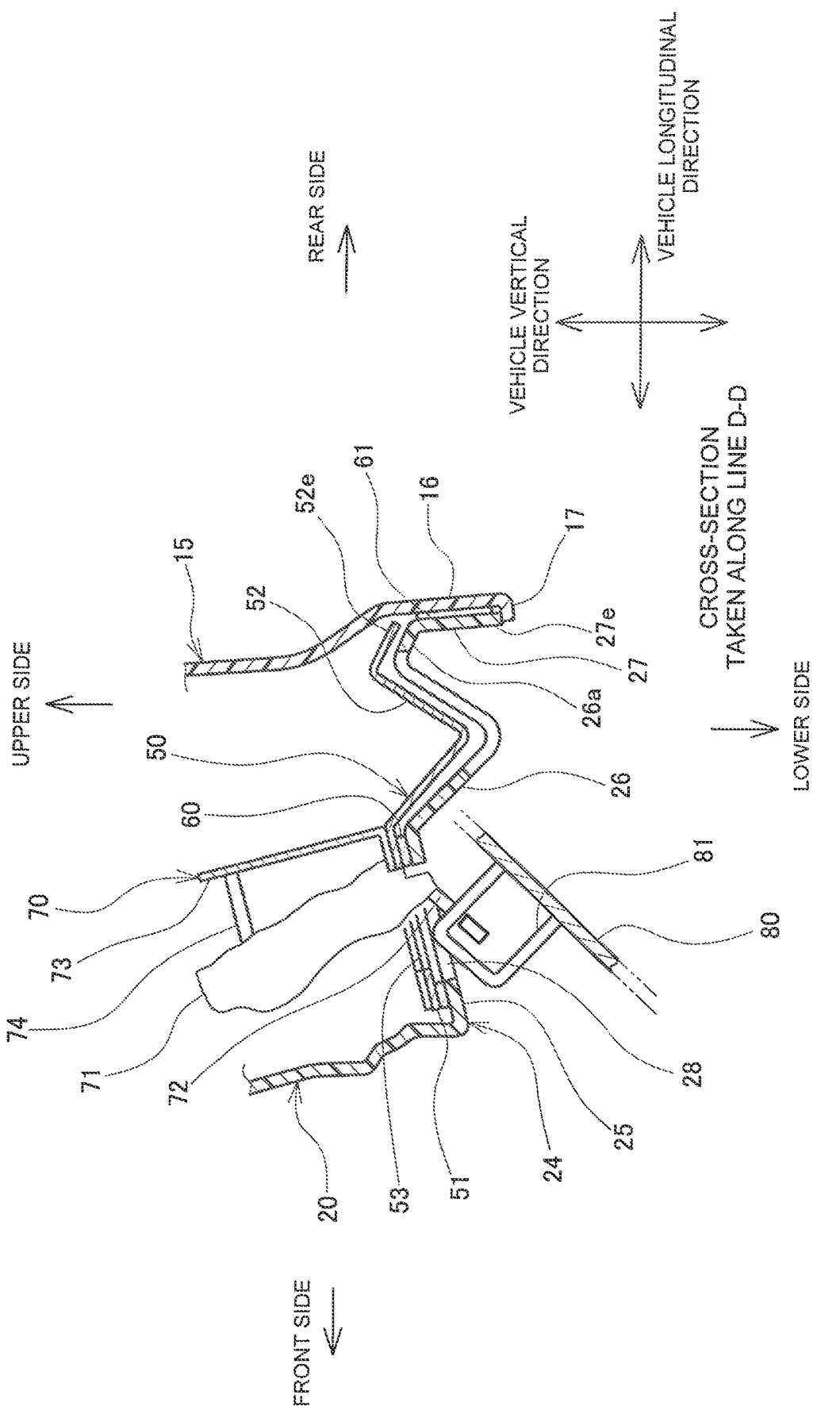
FIG. 7 is a cross-sectional view taken along line D-D of FIG. 6.
Figure 8:
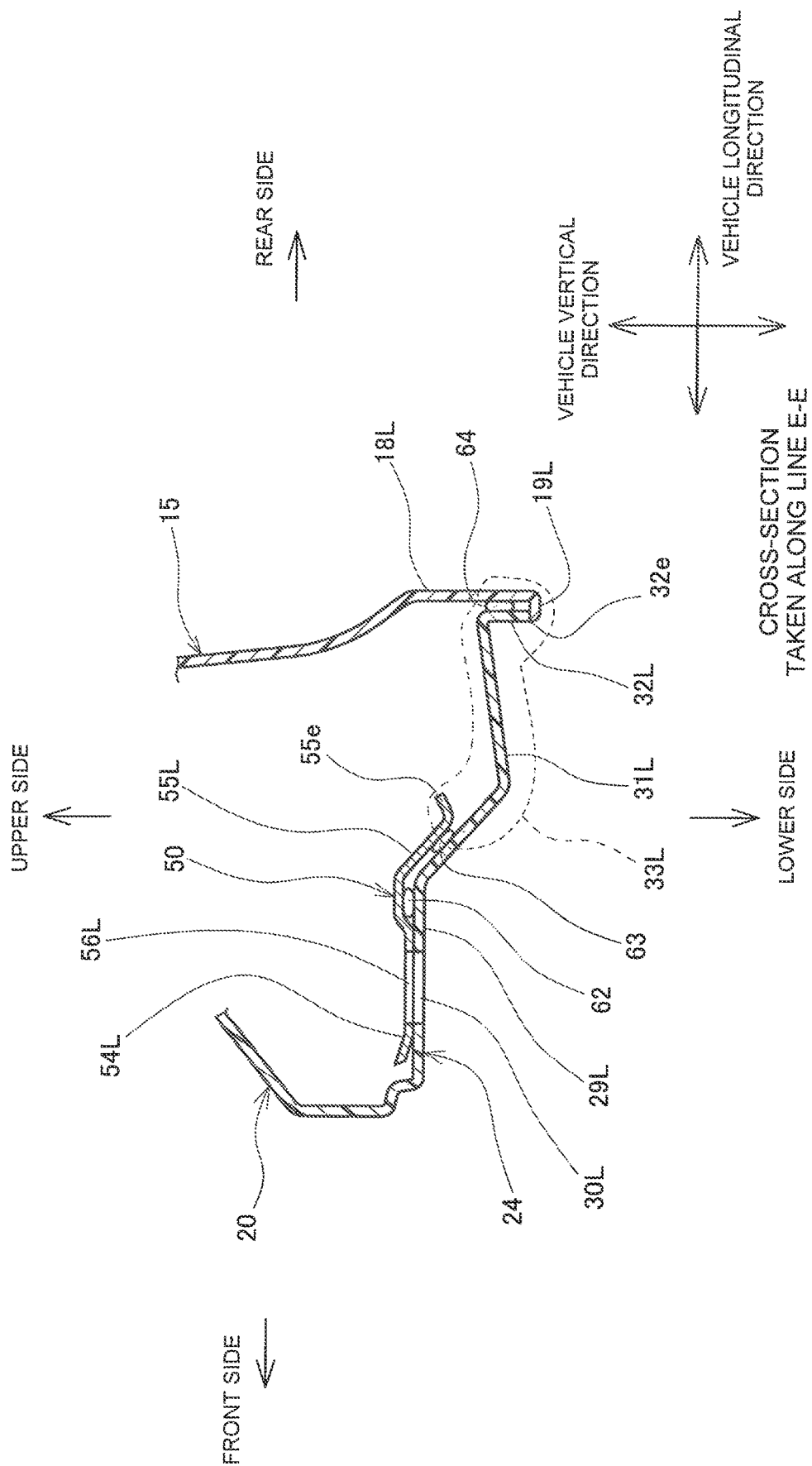
FIG. 8 is a cross-sectional view taken along line E-E of FIG. 6.

As illustrated in FIG. 4, the lower side portion 24 includes a center flat portion 25, a left flat portion 29L having a left opening 30L, and a right flat portion 29R provided with a right opening 30R. The center flat portion 25 includes left and right ribs 36L and 36R for connecting the center flat portion 25 and a projecting portion 34 projecting upward to the rear side of the vehicle, and an opening 28 through which a hook 72 of the door lock mechanism 70 illustrated in FIG. 7 is inserted. As illustrated in FIG. 7, the center flat portion 25 has a vehicle-rearward end connected to a groove portion 26 bent into a V-shape projecting obliquely downward to the rear side of the vehicle, and the groove portion 26 has a vehicle-rearward end 26a bent obliquely downward to the rear side of the vehicle and connected to a flange 27 extending to the lower side of the vehicle. Furthermore, as illustrated in FIG. 8, the left flat portion 29L has a vehicle-rearward end connected to a left step portion 31L bent into a projection projecting obliquely downward to the rear side of the vehicle. The left step portion 31L has a vehicle-rearward end connected to a flange 32L extending to the lower side of the vehicle. As in the left flat portion 29L, the right flat portion 29R continues to a right step portion 31R and a flange 32R to the rear side of the vehicle.

Figure 5:
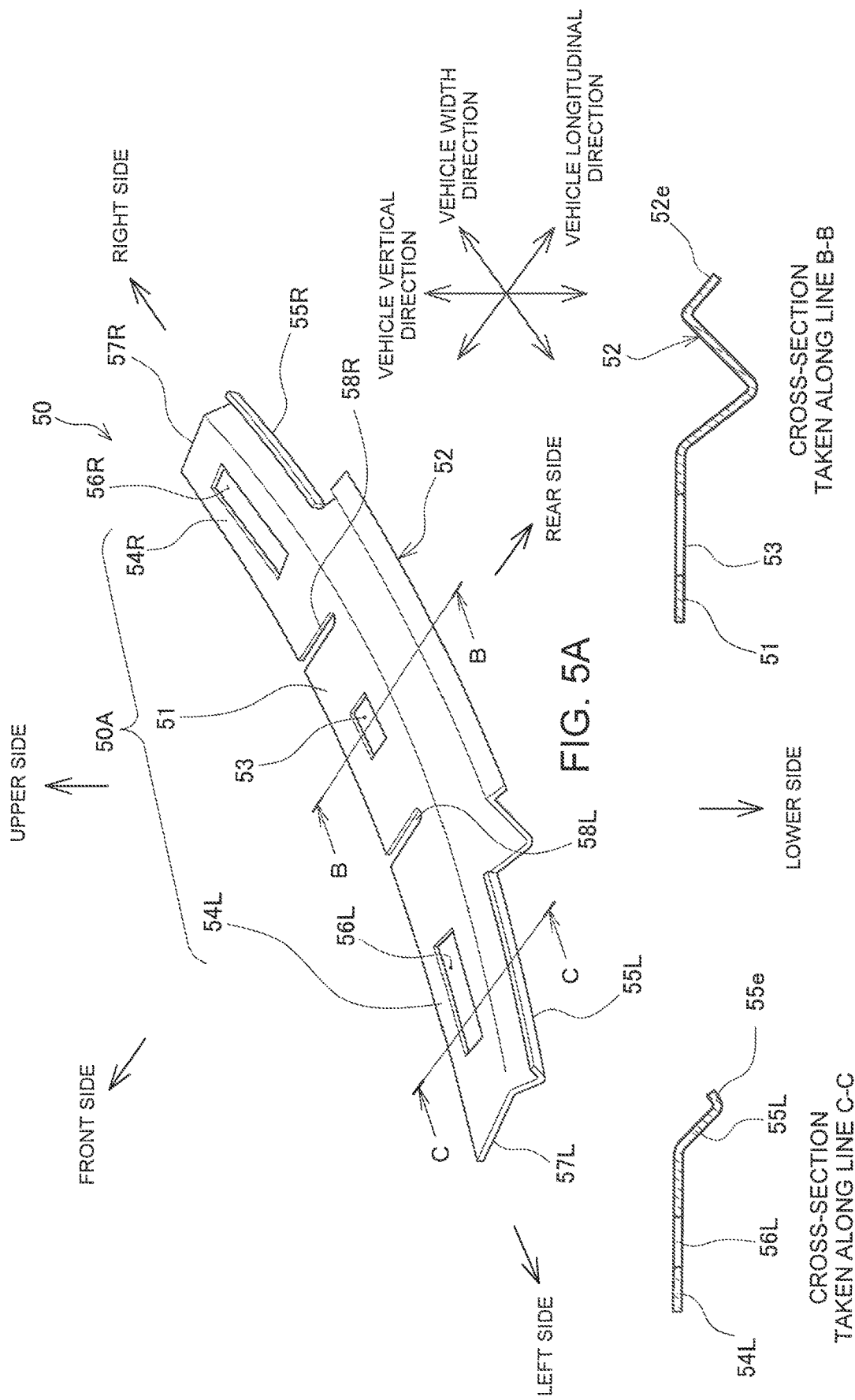
FIG. 5A is a perspective view of a lower-side reinforcing member of a resin back door according to an embodiment.
FIG. 5B is a cross-sectional view taken along line B-B of the FIG. 5A.
FIG. 5C is a cross-sectional view taking along line C-C of the FIG. 5A.

As illustrated in FIG. 5A, the lower-side reinforcing member 50 includes a main body 50A, a first extending portion 52 extending to the rear side of the vehicle from the main body 50A, and left and right second extending portions 55L and 55R.

The main body 50A includes the center plate portion 51 as a center portion in a vehicle width direction having a strip shape to be assembled to the center flat portion 25 of the lower side portion 24 of the inner panel 20, a left plate portion 54L as a left side portion in a vehicle width direction assembled to the left flat portion 29L of the lower side portion 24, and a right plate portion 54R as a right side portion in the vehicle width direction assembled to the right flat portion 29R of the lower side portion 24. The center plate portion 51 is provided with an opening 53 defined to be fixed to the lower side portion 24 of the inner panel 20, overlapping the opening 28 defined in the center flat portion 25 of the lower side portion 24, and inserting therethrough the hook 72 of the door lock mechanism 70 illustrated in FIG. 7. The center plate portion 51 is provided with left and right slits 58L and 58R for inserting the left and right ribs 36L and 36R provided in the lower side portion 24 of the inner panel 20 illustrated in FIG. 4. The left plate portion 54L and the right plate portion 54R include openings 56L and 56R defined to be fixed to the lower side portion 24 of the inner panel 20, overlapping the left opening 30L and the right opening 30R of the left flat portion 29L and the right flat portion 29R, respectively.

As illustrated in FIG. 5B, the first extending portion 52 is a bent plate extending to the rear side of the vehicle from a vehicle-rearward end of the center plate portion 51 and having a cranked cross-section. The first extending portion 52 is bent in conformance with the shape of the groove portion 26 of V-shape of the lower side portion 24 of the inner panel 20 and an upper surface of the vehicle-rearward end 26a of the groove portion 26. As illustrated in FIG. 5C, the left second extending portion 55L is a bent plate extending to the rear side of the vehicle from a vehicle-rearward end of the left plate portion 54L and having an L-shaped cross-section. The left second extending portion 55L is bent in conformance with the shape of an upper surface of the left step portion 31L of the lower side portion 24 of the inner panel 20.

Figure 6:
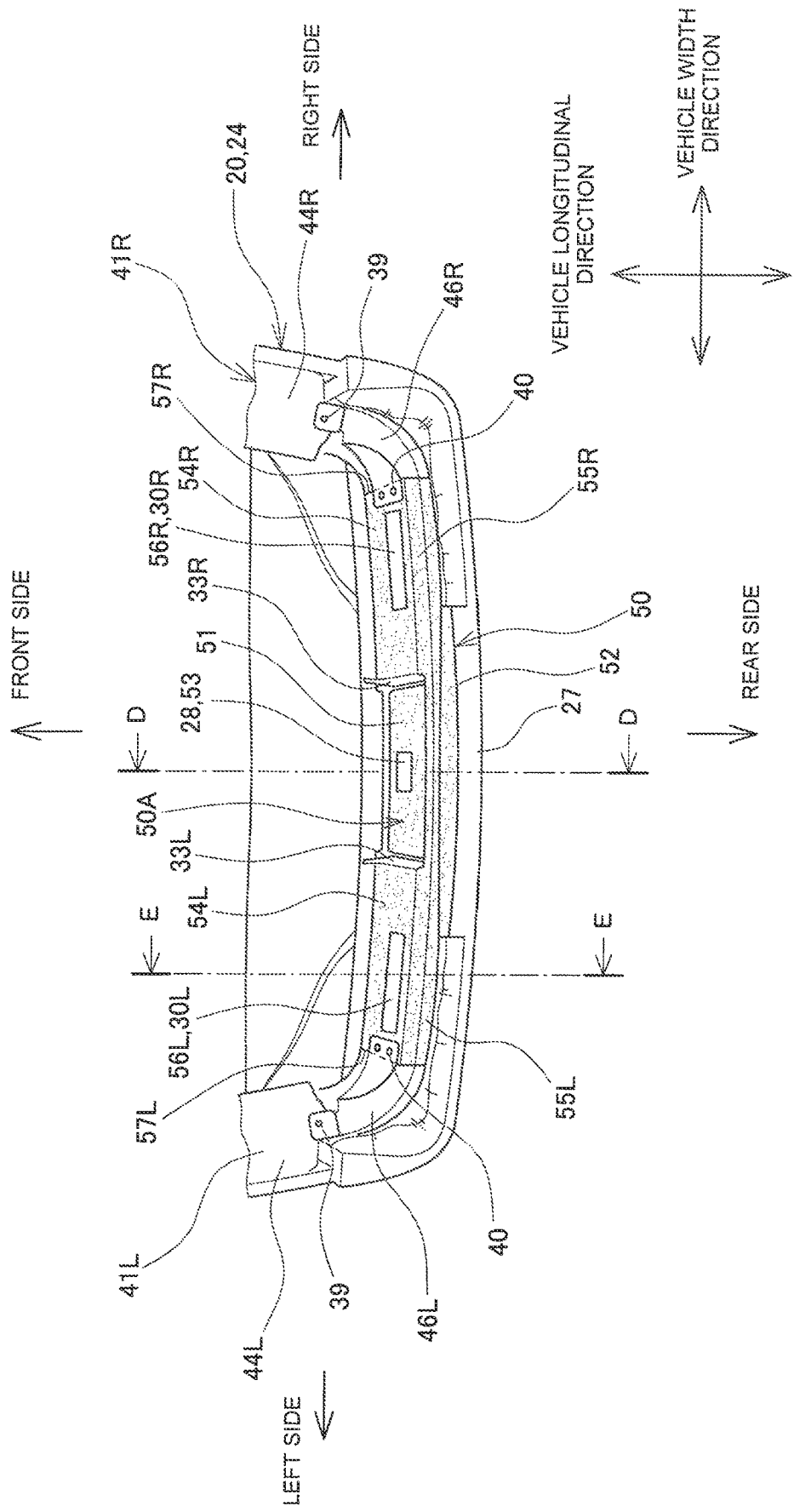
FIG. 6 is a perspective view of a lower-side reinforcing member fixed to an inner panel in a resin back door according to an embodiment.

As illustrated in FIG. 6, the lower-side reinforcing member 50 is formed so that the openings 53, 56L, and 56R are aligned with the openings 28, 30L, and 30R of the lower side portion 24 of the inner panel 20, and the center plate portion 51 is fixed on an upper surface of the center flat portion 25 of the lower side portion 24 with the adhesive 60 illustrated in FIG. 7. The left plate portion 54L and the second extending portion 55L are respectively fixed to upper surfaces of the left flat portion 29L and the left step portion 31L of the lower side portion 24 with adhesives 62 and 63 illustrated in FIG. 8. The right plate portion 54R and the second extending portion 55R are fixed to upper surfaces of the right flat portion 29R and the right step portion 31R of the lower side portion 24 with the adhesives 62 and 63. In FIG. 6, a shaded portion indicates the lower-side reinforcing member 50.

As illustrated in FIG. 7, when the center plate portion 51 is fixed to the lower side portion 24 of the inner panel 20 with the adhesive 60, the first extending portion 52 extends from the upper surface of the groove portion 26 of V-shape of the lower side portion 24 to the rear side of the vehicle along the upper surface of the vehicle-rearward end 26a of the groove portion 26. The first extending portion 52 has a vehicle rear end 52e extending up to the flange 27, formed as an end portion for the outer panel, of the lower side portion 24 of the inner panel 20.

As illustrated in FIG. 8, the second extending portion 55L is fixed to the left step portion 31L on the front side of the vehicle, of the lower side portion 24 of the inner panel 20 with the adhesive 63. The length of the second extending portion 55L in a vehicle longitudinal direction is smaller than the length of the first extending portion 52 in a vehicle longitudinal direction. Therefore, a vehicle-rearward end portion 55e of the second extending portion 55L does not extend up to the flange 32L, formed as an end portion for the outer panel, of the lower side portion 24 of the inner panel 20, and terminates at an intermediate portion of the left step portion 31L.

As illustrated in FIG. 7, the lower center portion 16 of the lower outer panel 15 is fixedly bonded to the flange 27 of the lower side portion 24 of the inner panel 20 with an adhesive 61, and a center lower end 17 of the lower outer panel 15 is integrated with a lower end 27e of the flange 27 of the inner panel 20. The lower outer panel 15 has a lower left portion 18L fixedly bonded to the flange 32L of the lower side portion 24 of the inner panel 20 with an adhesive 64 so that the lower left portion 18L of the lower outer panel 15 is integrated with a lower end 32e of the flange 32L of the inner panel 20.

As illustrated in FIG. 7, the door lock mechanism 70 is attached to the center plate portion 51 of the lower-side reinforcing member 50. The door lock mechanism 70 includes a main body 71, the hook 72 projecting from the main body 71 to be engaged with a striker 81 attached to the vehicle lower structure 80, a bracket 73 to which the main body 71 is fixed, and an attaching member 74 for connecting the main body 71 to the bracket 73. The door lock mechanism 70 is attached to the center plate portion 51 of the lower-side reinforcing member 50 via the bracket 73. As illustrated in FIG. 7, when the resin back door 100 is closed, the hook 72 of the door lock mechanism 70 is engaged with the striker 81 attached to the vehicle lower structure 80, and the center plate portion 51 of the lower-side reinforcing member 50 positioned at the center portion in a vehicle width direction is fixed to the vehicle lower structure 80. As described above, the lower-side reinforcing member 50 is configured so that when the resin back door 100 is closed, the center plate portion 51 positioned at the center portion in a vehicle width direction is locked to the vehicle lower structure 80 via the door lock mechanism 70.

Figure 9A:
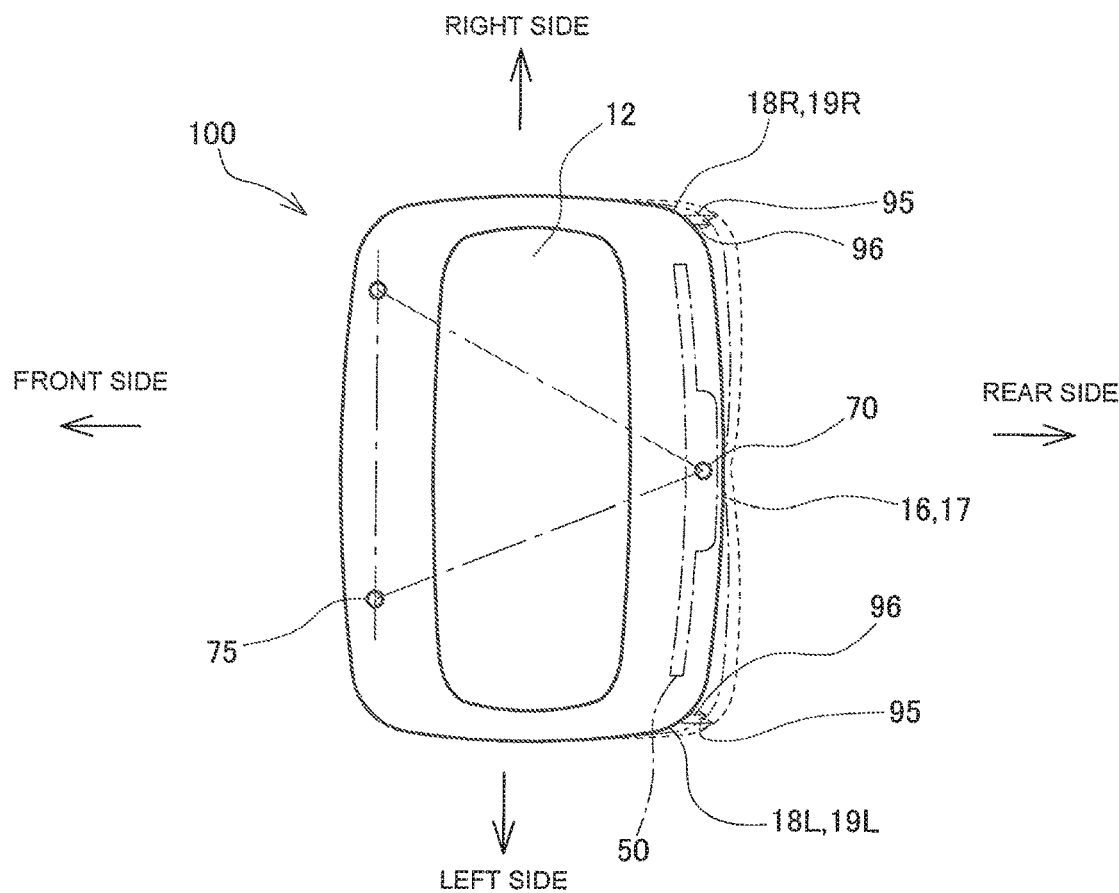
FIG. 9A is a plan view of thermal deformation of a resin back door according to an embodiment.
Figure 9B:
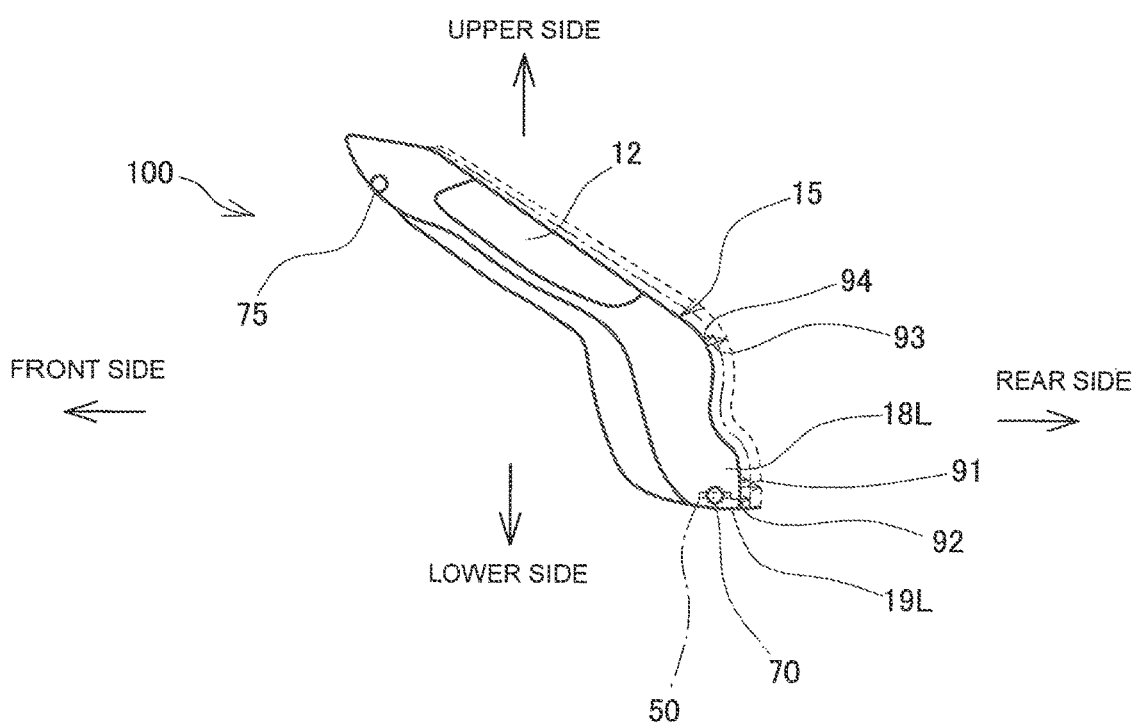
FIG. 9B is an elevational view of thermal deformation of a resin back door according to an embodiment.

Next, thermal deformation of the resin back door 100 caused by temperature rise due to sunlight will be described with reference to FIGS. 9A to 10. In FIGS. 9A and 9B, a broken line indicates thermal deformation of the resin back door 100 to which the lower-side reinforcing member 50 is not attached, and a dashed-dotted line indicates thermal deformation of the resin back door 100 to which the lower-side reinforcing member 50 is attached.

As illustrated in FIG. 9A, the resin back door 100 in a closed state is supported on the vehicle body at three points; that is, by a pair of right and left hinges 75 positioned at upper portions and the door lock mechanism 70 positioned at a lower center. When the temperature rises due to sunlight and the resin back door 100 thermally expands, the positions around the hinges 75 and door lock mechanism 70 supported by the vehicle body do not change so much. Thus, as indicated by an arrow 93 in FIG. 9B, at a center portion of the resin back door 100 in a vehicle width direction, a lower side portion of the back window 12 positioned between the hinges 75 and the door lock mechanism 70 is deformed so as to protrude obliquely upward to the rear side of the vehicle. In the absence of the lower-side reinforcing member 50, a lower center portion in a vehicle width direction locked to the vehicle lower structure 80 by the door lock mechanism 70 is not greatly displaced to the rear side of the vehicle, but the lower left portion 18L and the lower right portion 18R of the resin back door 100 not fixed to the vehicle lower structure 80 are deformed so as to protrude to the rear side of the vehicle as indicated by a broken line, an arrow 95 in FIG. 9A, and an arrow 91 in FIG. 9B.

When the thermal displacement of the lower left portion 18L and the lower right portion 18R of the resin back door 100 increases, a level difference or gap between the vehicle body opposed to the lower left portion 18L and the lower right portion 18R increases due to thermal displacement, resulting in poor appearance.

Therefore, the resin back door 100 according to the present embodiment is configured so that the lower-side reinforcing member 50 made of metal and extending in a vehicle width direction is attached to the lower side portion 24 of the inner panel 20, and the lower-side reinforcing member 50 is configured so that when the resin back door 100 is closed, the center plate portion 51 positioned at the center portion in a vehicle width direction is locked to the vehicle lower structure 80 via the door lock mechanism 70.

Since the center portion of the lower-side reinforcing member 50 is fixed to the vehicle lower structure 80 by using the door lock mechanism 70, the center portion is not displaced in a vehicle longitudinal direction. Furthermore, the lower-side reinforcing member 50 extending from the center portion in a vehicle width direction provides flexural rigidity in a vehicle longitudinal direction, suppressing displacement of the lower left portion 18L and the lower right portion 18R of the resin back door 100 to the rear side of the vehicle. In other words, the lower-side reinforcing member 50 has a reaction force at both ends in a vehicle width direction about the center portion locked to the vehicle lower structure 80 upon bending deformation to the rear side of the vehicle to suppress displacement of the lower left portion 18L and the lower right portion 18R of the resin back door 100 to the rear side of the vehicle. Thus, as indicated by the dashed-dotted lines and arrows 96 and 92 of FIGS. 9A and 9B, the thermal displacement of the lower left portion 18L and the lower right portion 18R of the resin back door 100 to the rear side of the vehicle can be considerably reduced compared with that of the resin back door 100 without the lower-side reinforcing member 50.

Furthermore, in the resin back door 100 according to the present embodiment, the hinges 75 are fastened to the left reinforcing member 41L and the right reinforcing member 41R at one end, respectively, and the lower-side reinforcing member 50 is locked to the vehicle lower structure 80 via the door lock mechanism 70. The left reinforcing member 41L and the right reinforcing member 41R and the lower-side reinforcing member 50 are connected by the left corner connecting member 46L and the right corner connecting member 46R. Therefore, the rigidities of left reinforcing member 41L and the right reinforcing member 41R also reduce the thermal displacement of the lower left portion 18L and the lower right portion 18R of the resin back door 100.

Meanwhile, the second extending portions 55L and 55R are provided on both side portions of the lower-side reinforcing member 50, but the second extending portions 55L and 55R are considered to have larger flexural rigidity in a vehicle longitudinal direction when the second extending portions 55L and 55R have a larger width in a vehicle longitudinal direction to suppress displacement of the lower left portion 18L and the lower right portion 18R of the resin back door 100 to the rear side of the vehicle more effectively. However, when the second extending portions 55L and 55R are configured to extend to the rear side of the vehicle to the flange 32L of the lower side portion 24 of the inner panel 20 formed as the end portion for the outer panel by increasing the width in the vehicle longitudinal direction, the lower left end 19L and the lower right end 19R of the lower outer panel 15, which are a parting positioned at a lower end of the resin back door 100, are displaced to the rear side of the vehicle substantially horizontally, as indicated by a dashed-dotted line in FIG. 10.

In contrast, a study conducted by the inventors has found that when the second extending portions 55L and 55R are configured not to extend to the rear side of the vehicle to the flange 32L, the lower left end 19L and the lower right end 19R of the lower outer panel 15 are turned to the front side of the vehicle, and the turning enables a reduction in displacement of the lower left end 19L and the lower right end 19R of the lower outer panel 15 to the rear side of the vehicle.

As described above with reference to FIG. 8, in the resin back door 100 according to the present embodiment, the second extending portions 55L and 55R provided at both side portions of the lower-side reinforcing member 50 do not extend to the flanges 32L and 32R formed as the end portions for the outer panel and positioned in the lower side portion 24 of the inner panel 20 to the rear side of the vehicle, but extend to front halves of the left step portion 31L and the right step portion 31R positioned toward the front side of the vehicle.

Figure 10:
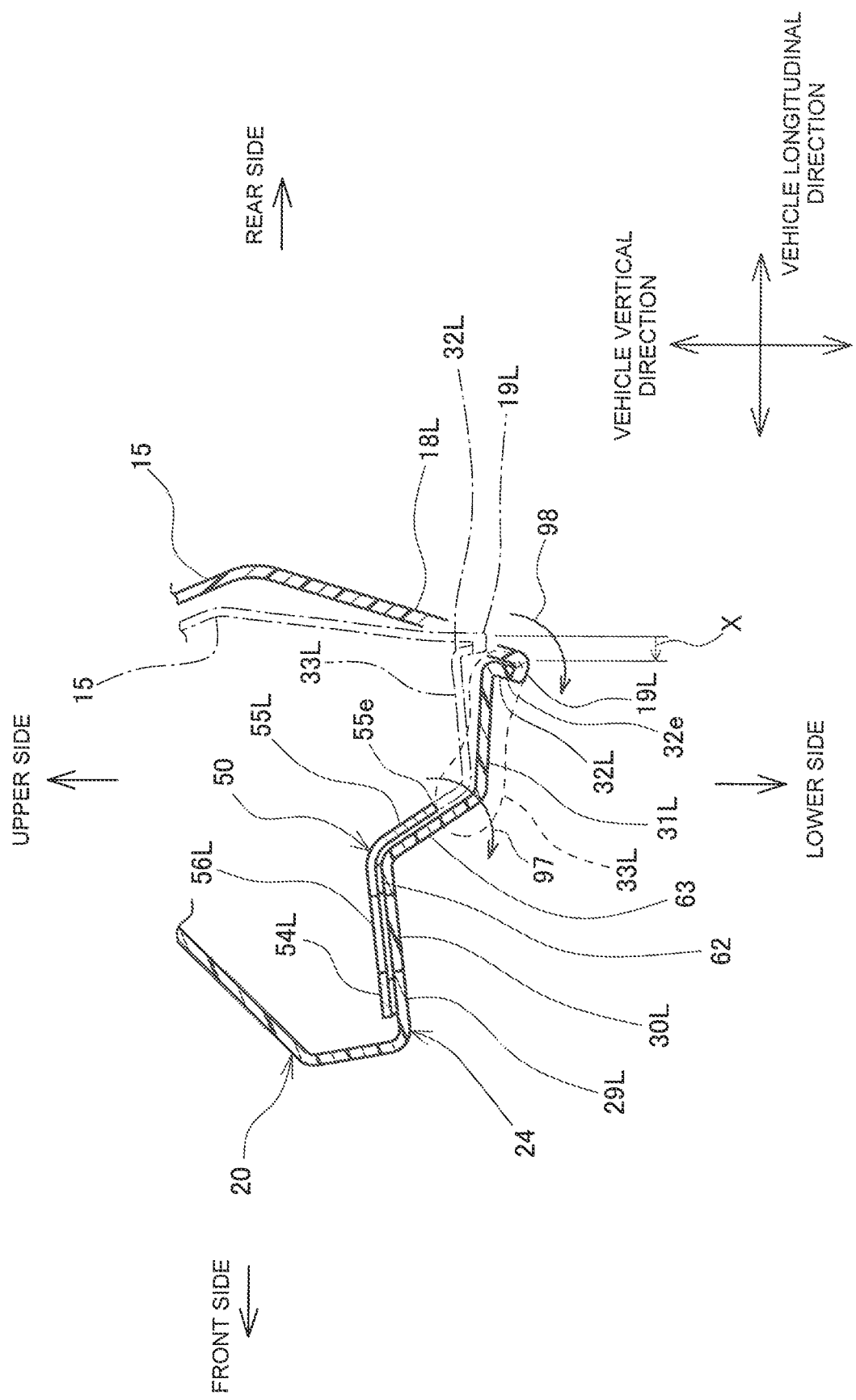
FIG. 10 is a cross-sectional view of thermal deformation of a lower end of an inner panel and a lower end of an outer panel in a cross-section taken along D-D line of FIG. 6.

In this configuration, as illustrated in FIG. 10, when temperature rises due to sunlight, a vehicle-rearward portion 33L positioned on the rear side of the vehicle relative to the vehicle-rearward end portion 55e of the second extending portion 55L turns toward the front side of the vehicle about a portion connected with the adhesive 63, as indicated by an arrow 97 in FIG. 10. Due to this turning, the lower left end 19L of the lower outer panel 15 being a parting and fixedly bonded to the lower end 32e of the flange 32L of the inner panel 20 also turns to the front side of the vehicle, as indicated by the arrow 97. Due to this turning, the lower left end 19L of the lower outer panel 15 moves toward the front side of the vehicle by a displacement X, as illustrated in FIG. 10. This displacement X toward the front side of the vehicle cancels displacement of the lower left end 19L of the lower outer panel 15 toward the rear side of the vehicle. As described above, in the resin back door 100 according to the present embodiment, the second extending portion 55L is prevented from extending toward the rear side of the vehicle to the flange 32L, being the end portion for the outer panel, of the lower side portion 24 of the inner panel 20, and the thermal displacement of the lower left end 19L of the lower outer panel 15 toward the rear side of the vehicle can be further reduced. As in the left portion of the vehicle, the second extending portion 55R is prevented from extending toward the rear side of the vehicle to the flange 32R, being the end portion for the outer panel, of the lower side portion 24 of the inner panel 20, and the thermal displacement of the lower right end 19R of the lower outer panel 15 toward the rear side of the vehicle can be further reduced.

As described above, the resin back door 100 according to the present embodiment more effectively suppresses the occurrence of a level difference between the periphery of the resin back door 100 and the vehicle body, effectively suppressing a deterioration in appearance of the resin back door 100 due to a rise in the temperature.

In the embodiments described above, the resin spoiler 11 and the upper outer panel 10 are described as separate bodies, but the resin spoiler 11 and the upper outer panel 10 may have an integral structure.

The invention claimed is:

1. A resin back door for a hatchback vehicle comprising:
a resin inner panel;
a resin outer panel; and
a lower-side reinforcing member made of metal extending in a vehicle width direction and fixed to an upward facing surface of a lower side portion of the resin inner panel, wherein
the lower-side reinforcing member has a center portion in the vehicle width direction fixed to a vehicle lower structure by a door lock mechanism upon closing the resin back door,
the door lock mechanism extends into an opening in the lower-side reinforcing member and an opening in the upward facing surface,
the lower-side reinforcing member extends across a majority of the resin inner panel in the vehicle width direction, and
the lower-side reinforcing member includes a downward bend and an upward bend between a rear side of the vehicle and the opening.

2. The resin back door according to claim 1, wherein the lower-side reinforcing member includes:
a strip-shaped body including the center portion and side portions in the vehicle width direction;
a first extending portion extending to a rear side of the vehicle from the center portion to an end portion for the resin outer panel in the lower side portion of the resin inner panel; and
second extending portions extending to the rear side of the vehicle from the side portions,
wherein a length of a second extending portion in a vehicle longitudinal direction is smaller than a length of the first extending portion in the vehicle longitudinal direction.

3. The resin back door according to claim 2, wherein an upper side portion of the resin inner panel has both of the side portions turnably attached to a vehicle upper structure via hinges, and
the resin back door includes:
a left reinforcing member made of substantially L-shaped metal fixed along the upper side portion and a left side portion of the resin inner panel, the left reinforcing member including an upper left shoulder portion opposed to the upper side portion and configured to secure one end of one of the hinges, and a left arm portion opposed to the left side portion;

a right reinforcing member made of substantially L-shaped metal fixed along the upper side portion and a right side portion of the resin inner panel, the right reinforcing member including an upper right shoulder portion opposed to the upper side portion and configured to secure one end of another one of the hinges, and a right arm portion opposed to the right side portion;

a left corner connecting member made of metal to connect the lower-side reinforcing member and a lower end of the left arm portion of the left reinforcing member; and a right corner connecting member made of metal to connect the lower-side reinforcing member and a lower end of the right arm portion of the right reinforcing member.

4. The resin back door according to claim 1, wherein the lower-side reinforcing member is fixed directly to the upward facing surface of a lower side portion of the resin inner panel.

5. The resin back door according to claim 1, wherein the lower-side reinforcing member includes, in order, the downward bend, the upward bend, and a second downward bend between a rear side of the vehicle and the opening.

6. The resin back door according to claim 1, wherein the lower-side reinforcing member includes a right opening and a left opening through the lower-side reinforcing member on opposed sides of the opening in the lower-side reinforcing member, and the lower side portion of the resin inner panel includes two openings respectively aligned with the right opening and the left opening.

7. A resin back door for a hatchback vehicle comprising:

a resin inner panel;

a resin outer panel; and a lower-side reinforcing member made of metal extending in a vehicle width direction and fixed to an upward facing surface of a lower side portion of the resin inner panel, wherein the lower-side reinforcing member has a center portion in the vehicle width direction fixed to a vehicle lower structure by a door lock mechanism upon closing the resin back door, the door lock mechanism extends into an opening in the lower-side reinforcing member and an opening in the upward facing surface, the lower-side reinforcing member extends across a majority of the resin inner panel in the vehicle width direction, the lower-side reinforcing member includes a right opening and a left opening through the lower-side reinforcing member on opposed sides of the opening in the lower-side reinforcing member, and the lower side portion of the resin inner panel includes two openings respectively aligned with the right opening and the left opening.

\* \* \* \* \*